(12) United States Patent
Tsirkin (10) Patent No.: US 9,355,133 B2
(45) Date of Patent: May 31, 2016

(54) OFFLINE COMPRESSION FOR LIMITED SEQUENCE LENGTH RADIX TREE

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 213 days.

(21) Appl. No.: 14/272,444

(22) Filed: May 7, 2014

(65) Prior Publication Data

US 2015/0324401 A1 Nov. 12, 2015

(51) Int. Cl.
*G06F 17/30* (2006.01)

(52) U.S. Cl.
CPC .... *G06F 17/30327* (2013.01); *G06F 17/30501* (2013.01)

(58) Field of Classification Search
CPC ........................................................ G06F 17/30
USPC ................................................ 707/600–899
See application file for complete search history.

(56) References Cited

U.S. PATENT DOCUMENTS

| | | | |
|---|---|---|---|
| 5,946,679 A | 8/1999 | Ahuja et al. | |
| 6,067,574 A | 5/2000 | Tzeng | |
| 6,662,184 B1 * | 12/2003 | Friedberg | G06F 17/30625 707/754 |
| 7,903,666 B1 | 3/2011 | Kumar et al. | |
| 7,936,764 B1 | 5/2011 | Krishnan | |
| 2003/0031167 A1 | 2/2003 | Singh et al. | |
| 2013/0034096 A1 | 2/2013 | Hu et al. | |

FOREIGN PATENT DOCUMENTS

WO WO 2009078028 A1 6/2009

OTHER PUBLICATIONS

Viktor Leis et al., The Adaptive Radix Tree: ARTful Indexing for Main-Memory Databases, retrieved on May 6, 2014 from http://wwwkemper.informatik.tu-muenchen.de/~leis/papers/ART.pdf; 12 pages.
Matthias Boehm et al., Efficient In-Memory Indexing with Generalized Prefix Trees, TU Dresden; Database Technology Group, retrieved on May 7, 2014 from https://wwwdb.inf.tu-dresden.de/misc/team/boehm/pubs/btw2011.pdf, 20 pages, Dresden, Germany.
(Continued)

*Primary Examiner* — Isaac M Woo
(74) *Attorney, Agent, or Firm* — Haynes and Boone, LLP (57) ABSTRACT

Systems and methods are disclosed for compressing a radix tree. An example method of compressing a radix tree includes traversing a radix tree including a plurality of containers. The method also includes identifying, based on the traversing, a parent container having a single immediate child container. The parent container includes a first set of elements, and the child container includes a second set of elements. The method further includes determining whether a length of the first set of elements included in the parent container satisfies a threshold. The method also includes when the length of the first set of elements is determined to satisfy the threshold, combining the parent and child containers into a single container.

20 Claims, 8 Drawing Sheets

(56) References Cited

OTHER PUBLICATIONS

Diego Arroyuelo et al., Space-Efficient Construction of LZ-Index, retrieved on May 7, 2014 from http://citeseerx.ist.psu.edu/viewdoc/download?doi=10.1.1.89.132&rep=rep1&type=pdf, pp. 1143-1152, © Springer-Verlag Berlin Heidelberg 2005.

Austin T. Clements et al., Radix VM: Scalable Address Spaces for Multithreaded Applications, Department of Computer Science, retrieved on May 7, 2014 from http://people.csail.mit.edu/nickolai/papers/clements-radixvm.pdf; pp. 1-14, Copyright © 2013 ACM 978-1-4503-1994-2/13/04.

\* cited by examiner

OFFLINE COMPRESSION FOR LIMITED SEQUENCE LENGTH RADIX TREE

BACKGROUND

The present disclosure generally relates to a radix tree, and more particularly to compressing radix tree.

A radix tree is a data structure that is used to store data. A radix tree may be useful for constructing associative arrays with keys that can be expressed as strings and typically supports insertion, deletion, and search operations. The insertion operation adds a new string to the radix tree while trying to minimize the amount of data stored. The deletion operation removes a string from the radix tree. A search operation may include an exact lookup of a string, a lookup of a predecessor or successor of the string, or a lookup of all strings with a particular prefix.

BRIEF SUMMARY

This disclosure relates to compressing a radix tree. Methods, systems, and techniques for compressing a radix tree are provided.

According to an embodiment, a method of compressing a radix tree includes traversing a radix tree including a plurality of containers. The method also includes identifying, based on the traversing, a parent container having a single immediate child container. The parent container includes a first set of elements, and the child container includes a second set of elements. The method further includes determining whether a length of the first set of elements included in the parent container satisfies a threshold. The method also includes when the length of the first set of elements is determined to satisfy the threshold, combining the parent and child containers into a single container.

According to another embodiment, a system for compressing a radix tree includes a retriever that retrieves a radix tree stored in a memory. The system also includes a traverser that traverses the radix tree. The traverser identifies, based on the traversal, a parent container having a single immediate child container. The parent container includes a first set of elements, and the child container includes a second set of elements. The system further includes a compressor that determines whether a length of the first set of elements included in the parent container satisfies a threshold. When the length of the first set of elements is determined to satisfy the threshold, the compressor combines the parent and child containers into a single container.

According to another embodiment, a non-transitory machine-readable medium includes a plurality of machine-readable instructions that when executed by one or more processors are adapted to cause the one or more processors to perform a method including: traversing a radix tree including a plurality of containers; identifying, based on the traversing, a parent container having a single immediate child container, the parent container including a first set of elements, and the child container including a second set of elements; determining whether a length of the first set of elements included in the parent container satisfies a threshold; and when the length of the first set of elements is determined to satisfy the threshold, combining the parent and child containers into a single container.

BRIEF DESCRIPTION OF THE DRAWINGS

The accompanying drawings, which form a part of the specification, illustrate embodiments of the invention and together with the description, further serve to explain the principles of the embodiments. Embodiments of the present disclosure and their advantages are best understood by referring to the detailed description that follows. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Example Method
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A radix tree may store one or more keys. If the radix tree stores a key that starts with 100 "0"s, the radix tree may have a depth of 100, stretching down to 100 levels. After the first 100 levels, the path may branch out. It may be time consuming to traverse the radix tree following a single path for 100 levels. It may be desirable to compress the radix tree.

Further, keys stored in the radix tree may have different lengths. To implement such a radix tree, memory to store the radix tree may be dynamically allocated or may be pre-allocated to ensure that sufficient memory is available to store the longest possible key for each node in the radix tree. Dynamically allocating memory and pre-allocating memory for a radix tree may have performance issues.

Unless specifically stated otherwise, as apparent from the following discussion, it is appreciated that throughout the description, discussions utilizing terms such as "receiving", "identifying", "traversing", "determining", and "combining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
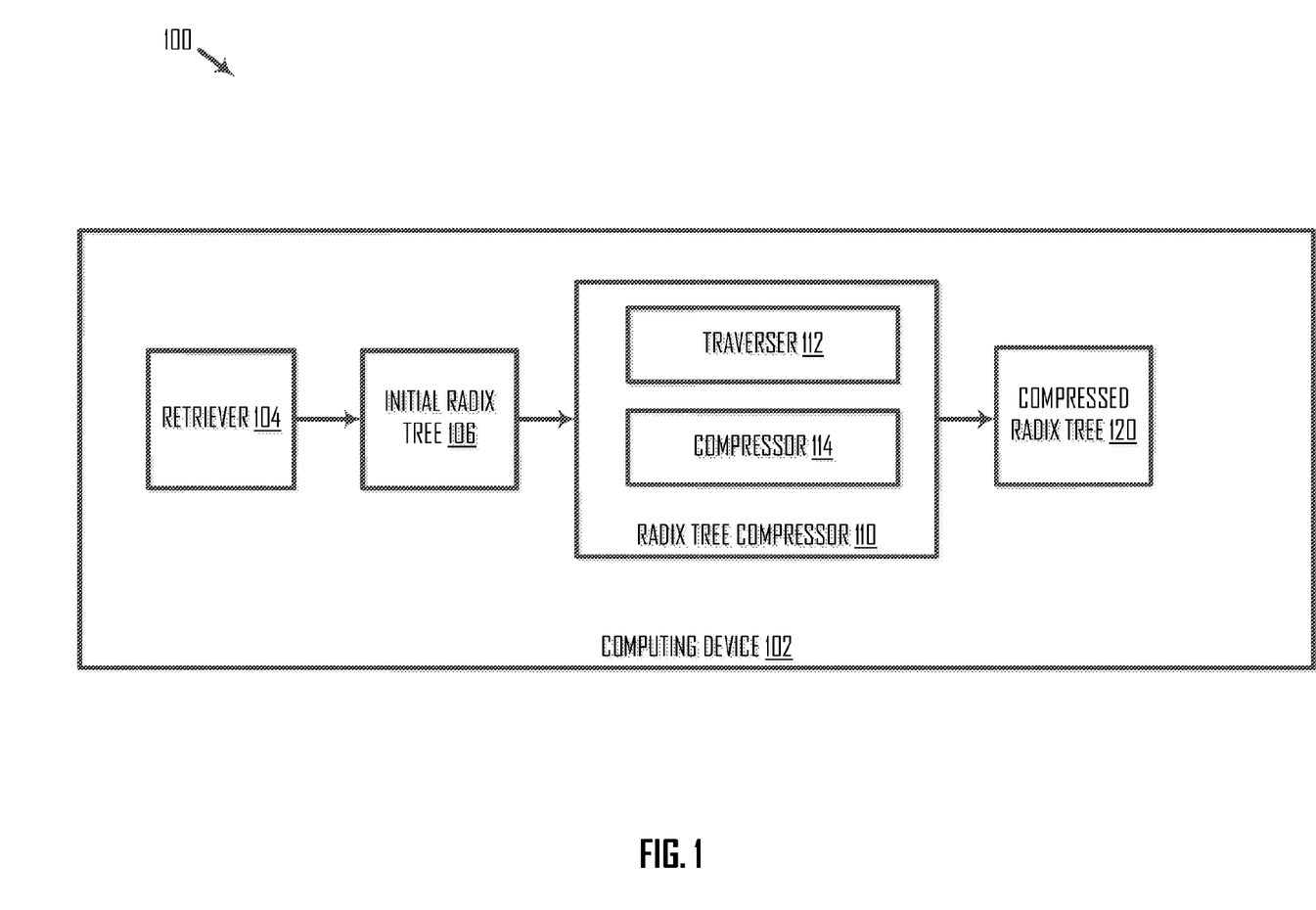
FIG. 1 is a block diagram illustrating a system for compressing a radix tree including a plurality of containers, according to an embodiment.

FIG. 1 is a block diagram 100 illustrating a system for compressing a radix tree including a plurality of containers, according to an embodiment. Diagram 100 includes a computing device 102. Computing device 102 may be a workstation, computer, server, game console, set-top box, kiosk, embedded system, mobile device (e.g., a mobile phone, personal digital assistant, tablet, and laptop), or other device having at least one processor and memory.

FIG. 1 also includes a retriever 104 and a radix tree compressor 110. Each of retriever 104 and radix tree compressor 110 is executable on computing device 102. Retriever 104 or radix tree compressor 110 may receive an instruction to compress initial radix tree 106. Retriever 104 retrieves an initial radix tree 106 stored in memory. A radix tree includes one or more containers and stores one or more keys. Initial radix tree 106 may include containers that have zero or more children. A node has a one-to-one relationship with an incoming edge, and the container may be a node or an edge of the radix tree. A key includes a sequence of elements. An element may be, for example, a symbol, character, letter, number, or bit. Other elements are within the scope of the disclosure.

The key may map to a value that is referenced by a leaf container in the radix tree. In an example, a key is a sequence of bits that represents an address in memory. In such an example, the key may represent an address supplied in an instruction (e.g., input/output (I/O) address for a port I/O or a physical memory address for memory I/O) that maps to a "target" that indicates the instruction type. In another example, a key is a word including a sequence of letters. In such an example, the radix tree may be used to index words in a text document.

Figure 2A:
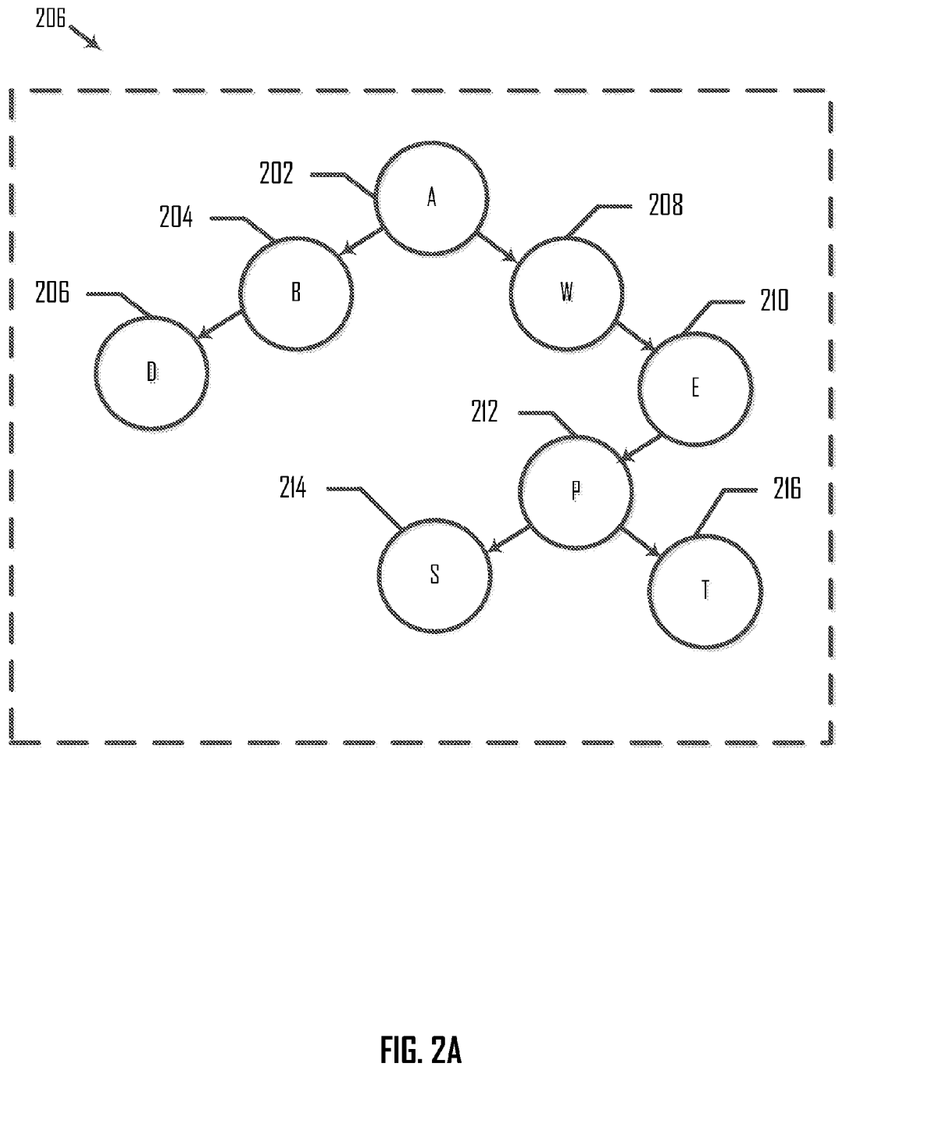
FIG. 2A is a block diagram illustrating an initial radix tree including a plurality of containers, according to an embodiment.
Figure 2B:
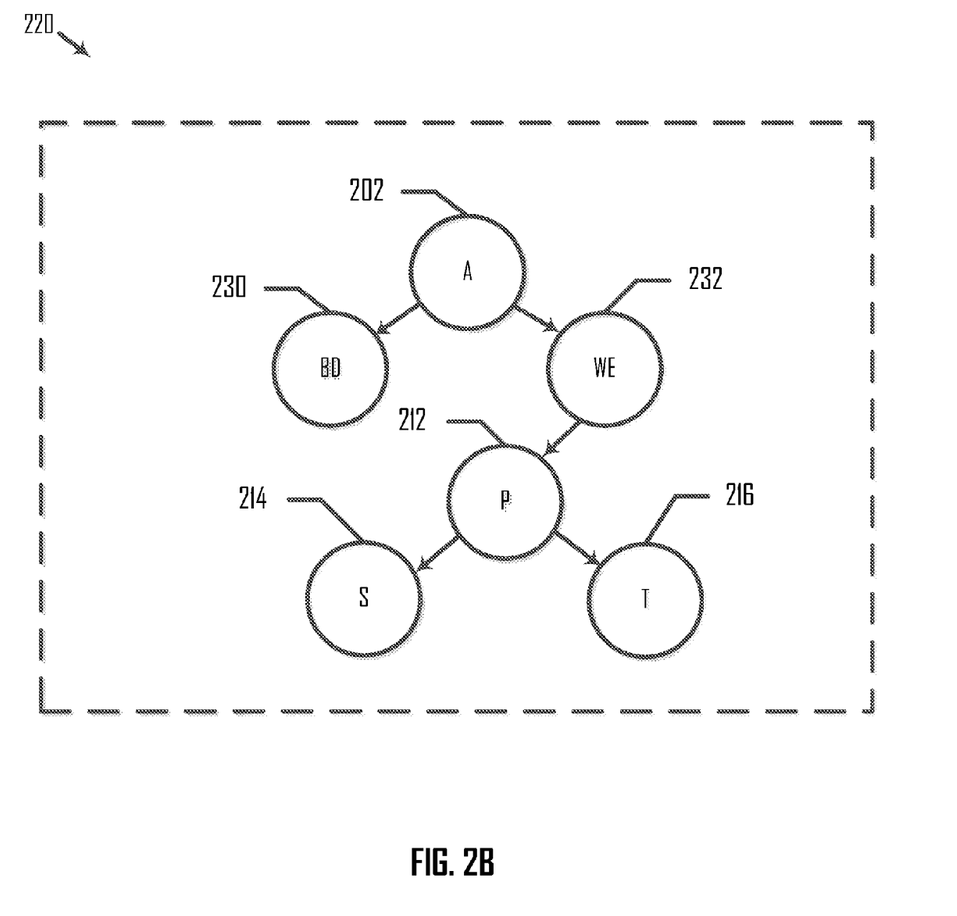
FIG. 2B is a block diagram illustrating a compressed radix tree resulting from the compression of the initial radix tree in FIG. 2A, according to an embodiment.

Radix tree compressor 110 traverses initial radix tree 106 and compresses it, thereby creating compressed radix tree 120. FIG. 2A is a block diagram illustrating an initial radix tree 206 including a plurality of containers, according to an embodiment. FIG. 2B is a block diagram illustrating a compressed radix tree 220 resulting from the compression of initial radix tree 206 in FIG. 2A, according to an embodiment. The description below will refer to FIG. 2A and FIG. 2B together to explain in further detail how radix tree compressor 110 compresses initial radix tree 206 to thereby create compressed radix tree 220.

In FIG. 2A, initial radix tree 206 includes one or more containers and stores one or more keys. Each container in initial radix tree 206 has zero or more children. Initial radix tree 206 includes a root container 202 that includes a single element "A" and is at a depth of zero in initial radix tree 206. Root container 202 has two immediate children, containers 204 and 208. Container 204 includes a single element "B", and container 208 includes a single element "W", and containers 204 and 208 are at a depth of one in initial radix tree 206. An immediate child container of a parent container refers to a direct edge relationship between two containers, where the immediate child is located one depth level below the parent container. In an example, containers 204 and 208 are immediate children of root container 202. An edge connects root container 202 to container 204, which is one depth level below root container 202. Additionally, an edge connects root container 202 to container 208, which is one depth level below root container 202. In contrast, although container 206 is a descendant of root node 202, container 206 is not an immediate child container of root node 202.

Container 204 has a single immediate child container 206, which includes a single element "D", and container 208 has a single immediate child container 210, which includes a single element "E". Containers 206 and 210 are at a depth of two in initial radix tree 206. Container 210 has a single immediate child container 212, which includes a single element "P" and is at a depth of three in initial radix tree 206. Container 212 has two immediate child containers 214 and 216, which are at a depth of four in initial radix tree 206. Container 214 includes a single element "S", and container 216 includes a single element "T". Containers 206, 214, and 216 are leaf containers because they have no children.

Initial radix tree 206 may store three keys. In an example, a first key "ABD" is stored in containers 202, 204, and 206. Container 206 may map to a value that is associated with the first key (not shown). A second key "AWEPS" is stored in containers 202, 208, 210, 212, and 214. Container 214 maps to a value that is associated with the second key (not shown). A third key "AWEPT" is stored in containers 202, 208, 210, 212, and 216. Container 216 maps to a value that is associated with the third key (not shown). In another example, initial radix tree 206 stores the prefix of one or more keys and stores more elements than that shown in FIG. 2A. For example, initial radix tree 206 stores a key "ABDRE" and only the first three elements of the key are shown in FIG. 2A (e.g., in containers 202, 204, and 206).

When a lookup for a key in a radix tree occurs, traverser 112 may traverse the radix tree to search for the key. In an example, traverser 112 starts from the root container, which stores the first set of elements of the key that is being searched for. Traverser 112 then looks at the root container's children to search for the next sequence of one or more elements in the searched-for key after the first set of elements included in the root container. A leaf container may be associated with a value to which the key is mapped. In an embodiment, a leaf container of a key identifies a value to which the key maps and the value is associated with the key. Traverser 112 may look in the leaf container to identify a value to which the key maps. In an example, the value may be inserted in the leaf container. In another example, the leaf container references or points to the value.

In the example illustrated in FIG. 2A, each container in initial radix tree 206 includes a single element. Accordingly, the amount of memory that each container takes up is small and limited. Further, initial radix tree 206 has a depth of four. It may be desirable to compress initial radix tree 206 such that its depth is reduced. By reducing initial radix tree 206's depth, it may take fewer steps to determine whether a key or a key's prefix is stored in initial radix tree 206. Accordingly, searching of the compressed radix tree may be improved and the search time reduced, thus improving performance. For example, lookup time may be minimized and the number of memory accesses required during lookup reduced. Additionally, the size of initial radix tree 206 may be reduced such that it contains fewer containers.

Radix tree compressor 110 includes a traverser 112 and a compressor 114. In an embodiment, traverser 220 traverses initial radix tree 206 container by container and may identify the element included in one or more traversed containers. Traverser 112 may traverse initial radix tree 206 from root container 202 towards a leaf container of the radix tree. Traverser 112 may traverse the containers in initial radix tree 206 such that a parent of a given container is traversed before the given container is traversed. In an embodiment, traverser 112 identifies, based on the traversal, a parent container having single immediate child container. The parent container includes a first set of elements, and the child container includes a second set of elements. In the example illustrated in FIG. 2A, each container in initial radix tree 206 has a single element. Accordingly, the length of each set of elements stored in a container in initial radix tree 206 is one.

In an embodiment, compressor 114 determines whether a length of the first set of elements included in the parent container satisfies a first threshold. When the length of the first set of elements is determined to satisfy the threshold, compressor 114 may combine the parent and child containers into a single container. In an example, when the length of the set of elements included in the parent container is less than the threshold, the length satisfies the threshold.

Compressor 114 may also make other determinations before combining the parent and child containers into a single container. In an example, a container may include a value. Compressor 114 may determine whether the parent container has a value before combining the parent and child containers into a single container. In such an example, when the length of the first set of elements included in the parent container is determined to satisfy the threshold and when the parent container is determined to not have a value, compressor 114 combines the parent and child containers into a single container. Additionally, if the child container (e.g., leaf container) includes a value, compressor 114 may insert the value into the single container. If the child container (e.g., leaf container) includes a reference to the value, compressor 114 may insert the reference into the single container.

Combining the parent and child containers into a single container may cause the ancestry relationships of the containers in initial radix tree 206 to be rearranged. For example, a given child container may have a set of one or more children that should descend from the single container rather than from the given child container. In an embodiment, compressor 114 determines whether the given child container is a leaf container. When the given child container is determined to be a leaf container, compressor 114 may mark the single container as a leaf container. In another example, when the given child container is determined to be a leaf container, compressor 114 does nothing and traverser 112 continues traversing the remaining containers. When the given child container is determined to not be a leaf container, compressor 114 may identify a set of one or more children of the given child container and replace the given child container with the single container as the parent of the set of one or more children. In such a scenario in which the given child container is determined to not be a leaf container, the children of the given child container become the children of the single container. Accordingly, the descendants of the given child container becomes the descendants of the single container.

Traverser 112 may then identify whether the single container has a single immediate child container. If the single container has a single immediate child container, compressor 114 may then determine whether a length of the set of elements included in the single container satisfies a second threshold. In an example, the first threshold is the same as the second threshold. In another example, the first threshold is different from the second threshold. When the length of the set of elements included in the single container is determined to satisfy the second threshold, compressor 114 may combine the single container and its child container (e.g., the only child of the single container) into a second single container. Compressor 114 may continue to combine these containers accordingly until one of the resulting single containers does not have only one child.

Traverser 112 may traverse initial radix tree 206 from top (e.g., root node) to bottom (e.g., a leaf node). Traverser 112 may traverse initial radix tree 206 until all of the containers are traversed, until most containers are traversed, until a particular number of containers are traversed, and/or until containers at a particular depth have been traversed. In an example, initial radix tree 206 may be a non-compressed radix tree that includes at least one container having a single immediate child container. Additionally, each container in the non-compressed radix tree may store at most one element. In such an example, traverser 112 traverses a non-compressed radix tree that will be compressed, as will be described in the present disclosure.

In an example, traverser 112 traverses root container 202 down to a child container of the root container and continues to traverse the descendants of that child container until a leaf container is traversed. In such an example, traverser 112 may traverse root container 202, container 204 (a child of root container 202), and leaf container 206 (a descendant and child of container 204). If a container has more than one child, traverser 112 may re-traverse that container in order to traverse its one or more child containers. For example, traverser 112 may re-traverse root container 202 and continue on to traverse container 208 (a child of root container 202), container 210 (a descendant and child of container 208), container 212 (a descendant and child of container 210), and container 214 (a descendant and child of container 212). Traverser 112 may then re-traverse container 212 and continue on to traverse container 216.

In another example, traverser 112 starts at root container 202 at depth zero, goes down the next depth level and traverses each container at that depth level, and continues to go down one depth level at a time and traverse each container at that particular depth level before moving on to the next depth level. In such an example, traverser 112 may start at root container 202 at depth zero, traverse down to each of the containers at depth one (e.g., containers 204 and 208), traverse down to each of the containers at depth two (e.g., containers 206 and 210), traverse down to each of the containers at depth three (e.g., container 212), and then traverse down to each of the containers at depth four (e.g., containers 214 and 216). Accordingly, containers having a smaller depth are traversed before containers having a larger depth in initial radix tree 206. In other words, containers that are located closer to the root container are traversed before containers that are located farther from the root container. In such a traversal, the containers closer to the root node may store more elements than the containers farther from the root node. This, however, depends on how many children the containers have, as will be explained in further detail in the disclosure.

For example, when traverser 112 traverses root container 202, traverser 112 may determine how many children root container 202 has. As illustrated in the example in FIG. 2A, root container 202 has two children. Because root container 202 does not have only one child, root container 202 will not be combined with another container. No more containers are at depth zero of initial radix tree 206. Accordingly, traverser 112 may then continue down initial radix tree 206 by one-depth level and traverse the containers at that depth level. In particular, traverser 112 may go on to traverse containers 204 and 208 having a depth of one in initial radix tree 206. Although traverser 112 may be described as traversing one container before another container at the same depth level, this is not intended to be limiting and traverser 112 may traverse the containers at a particular depth level in any order.

Traverser 112 traverses container 204, which has single immediate child container. Traverser 112 identifies container 204 as being a parent container having a single immediate child container (e.g., container 206). Container 204 includes a first set of elements "B" having a length of one, and container 206 includes a second set of elements "D" having a length of one. Compressor 114 determines whether a length of the first set of elements included in the parent container satisfies a threshold. The threshold enables the number of elements included in a container to be limited. The smaller the threshold is the fewer elements that can be stored in a container. In contrast, the larger the threshold is the more elements that can be stored in the container. It may be desirable to limit the number of elements that can be stored in a container to limit the size of the container.

In an example, when the length of the first set of elements is less than the threshold, the length satisfies the threshold. In an example, the threshold is two. In such an example, when the length of the first set of elements is determined to be less than two, compressor 114 may combine containers 204 and 206 into a single container 230, which is illustrated in compressed radix tree 220 (FIG. 2B). In FIG. 2A, the length of the first set of elements "B" included in parent container 204 is one, which is less than the threshold two. Thus, the length of the first set of elements included in the parent container satisfies the threshold.

It is advantageous for compressor 114 to know that containers in initial radix tree 206 include only a single element. Accordingly, once compressor 114 determines that the length of the first set of elements included in parent container 204 is less than the threshold, compressor 114 may automatically determine that containers 204 and 206 should be combined into a single container because combining the two containers would result in a single container that stores a set of elements that does not exceed the threshold. To determine whether to combine the parent and child containers, it may be unnecessary for compressor 114 to compare the length of the first set of elements included in the parent container to the length of the second set of elements included in the child container because the first set of elements included in the parent container will be extended by only a single element and will not exceed the threshold. This may save time and processing power.

Compressor 114 combines parent container 204 and child container 206 (FIG. 2A) into a single container 230 (FIG. 2B). In FIG. 2B, compressed radix tree 220 includes root container 202 and single container 230. Single container 230 includes "BD", which includes the first set of elements and the second set of elements. Combining containers into a single container in this fashion may provide a faster lookup of keys or key prefixes that are not stored in the radix tree because the containers closer to the root container store more elements that may or may not match a sequence of elements in a key or key prefix being search for.

Compressor 114 may combine a parent container and a child container in a variety of ways. In an example, single container 230 is the parent container. In such an example, compressor 114 combines parent container 204 and child container 206 by appending the second set of elements included in the child container ("D") as a suffix to the first set of elements included in the parent container ("B"). Compressor 114 may then remove child container 206. In another example, single container 230 is the child container. In such an example, compressor 114 combines parent container 204 and child container 206 by appending the first set of elements ("B") as a prefix to the second set of elements included in the child container ("D"). Compressor 114 may then remove parent container 204. In another example, compressor 114 creates single container 230 and inserts a third set of elements into single container 230. The third set of elements is the first set of elements ("B") appended as a prefix to the second set of elements ("D"). Compressor 114 may then remove parent container 204 and child container 206.

Compressor 114 determines whether child container 206 is a leaf container. In the example illustrated in FIG. 2A, container 206 is a leaf container. Accordingly, compressor 114 may mark single container 230 as a leaf container or do nothing. Traverser 112 may determine how many children single container 230 has. Single container 230 in compressed radix tree 220 is located at a depth of one and has no children. Because single container 230 does not have a single immediate child, single container 230 will not be combined with another container.

Traverser 112 may continue to traverse the other containers having a depth level of one in the radix tree. For example, traverser 112 may go on to traverse container 208 (FIG. 2A), which has a single immediate child container and is located at a depth of one in the radix tree. Traverser 112 identifies container 208 as being a parent container having a single immediate child container, which is container 210. Container 208 includes a third set of elements "W" having a length of one, and container 210 includes a fourth set of elements "E" having a length of one. Compressor 114 determines whether a length of the third set of elements included in the parent container satisfies a threshold.

In keeping with the above example, the threshold is two and when the length of the set of elements included in the parent container is less than the threshold, the length satisfies the threshold. In such an example, when the length of the third set of elements is determined to be less than two, compressor 114 may combine containers 208 and 210 into a single container 232, which is illustrated in compressed radix tree 220 (FIG. 2B). In FIG. 2A, the length of the third set of elements "W" included in parent container 208 is one, which is less than the threshold of two. Thus, the length of the third set of elements included in the parent container satisfies the threshold. Compressor 114 combines parent container 208 and child container 210 (FIG. 2A) into a single container 232 (FIG. 2B). In FIG. 2B, compressed radix tree 220 includes single container 232 including "WE", which includes the third set of elements included in the parent container and the fourth set of elements included in the child container. By combining parent container 208 and child container 210, compressor 114 has compressed the number of depth levels of the radix tree from four to three.

Compressor 114 determines whether child container 210 is a leaf container. In the example illustrated in FIG. 2A, container 210 is not a leaf container. Rather, container 210 has a child, which is container 212. Compressor 114 may identify a set of one or more children of container 210 and replace container 210 with single container 232 as the parent of the identified set of children. In an example, the set of children of container 210 is container 212, and compressor 114 may make single container 232 the parent of the identified set of children (e.g., container 212). Thus, the parent of container 212 is no longer container 210. As illustrated in compressed radix tree 220 in FIG. 2B, single container 232 is the parent of container 212. In other words, container 212 is the child of single container 232. A traversal of a key or key prefix may include containers 202, 232, 212, and 214, which identifies "AWEPS".

Traverser 112 may determine how many children single container 232 has. Single container 232 in compressed radix tree 220 is located at a depth of one and has one child, container 212. Traverser 112 identifies single container 232 as being a parent container having a single immediate child, which is container 212. Single container 232 includes a fifth set of elements "WE" having a length of two, and container 212 includes a sixth set of elements "P" having a length of one. Compressor 114 determines whether a length of the fifth set of elements included in the parent container satisfies a threshold.

In keeping with the above example, the threshold is two and when the length of the set of elements included in the parent container is less than the threshold, the length satisfies the threshold. In such an example, when the length of the fifth set of elements is determined to be less than two, compressor 114 may combine containers 232 and 212 into a single container. In FIG. 2B, the length of the fifth set of elements "WE" included in container 232 is two, which is not less than the threshold of two. Thus, the length of the fifth set of elements included in the parent container does not satisfy the threshold and compressor 114 does not combine container 232 and child container 212 into a single container.

No more containers are at depth one of compressed radix tree 220 to traverse, and traverser 112 may then continue down compressed radix tree 220 by one-depth level to depth level two and traverse the containers at that depth level. For example, traverser 112 may go on to traverse container 212 having a depth of two in compressed radix tree 220. Container 212 has two children, containers 214 and 216. Because container 212 does not have a single immediate child container (because container 212 has a plurality of child containers), container 212 will not be combined with another container.

No more containers are at depth two of compressed radix tree 220 to traverse, and traverser 112 may then continue down compressed radix tree 220 by one-depth level to depth level three and traverse the containers at that depth level. For example, traverser 112 may go on to traverse containers 214 and 216 having a depth of three in compressed radix tree 220. Containers 214 and 216 have no children. Thus, containers 214 and 216 are leaf containers and are not combined with any other containers. No more containers are left to traverse in compressed radix tree 220.

FIG. 2A illustrates an example initial radix tree 206 having eight containers and a depth of four. FIG. 2B illustrates a resulting compressed radix tree after compressor 114 compresses initial radix tree 206 to thereby create compressed radix tree 220. In FIG. 2B, compressed radix tree 220 stores the same three keys or prefix keys as those keys or prefix keys stored in FIG. 2A. For example, in FIG. 2B, the first key or prefix key "ABD" is stored in containers 202 and 230, the second key or prefix key "AWEPS" is stored in containers 202, 232, 212, and 214, and the third key or prefix key "AWEPT" is stored in containers 202, 232, 212, and 216. In FIG. 2B, compressed radix tree 220 has six containers and a depth of three.

In the examples illustrated in FIGS. 2A and 2B, compressor 114 reduces initial radix tree 206's depth by one (e.g., from a depth of four to three) and the number of containers by two (e.g., from eight to six containers). Thus, compressed radix tree 220 may provide a faster lookup of keys that are not stored in the radix tree as compared to initial radix tree 206 because the containers in compressed radix tree 220 that are closer to the root container store more elements that may or may not match a sequence of elements in a key being search for. Additionally, when traverser 112 traverses compressed radix tree 220 to determine whether it stores a particular key or key prefix, compressed radix tree 220 has a shallower depth than initial radix tree 206 and thus traverser 112 traverses down fewer levels to make this determination as compared to traversing initial radix tree 206 to search for the key or key prefix.

Figure 3A:
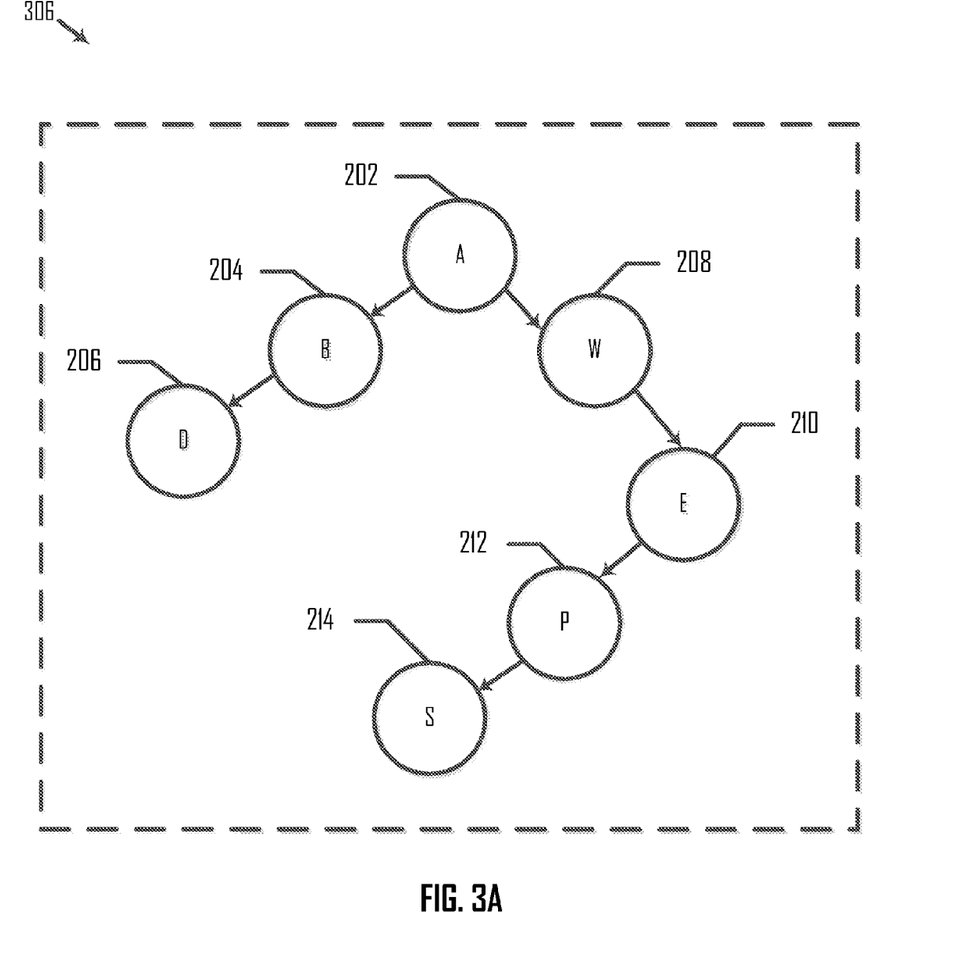
FIG. 3A is a block diagram illustrating an initial radix tree including a plurality of containers, according to an embodiment.
Figure 3B:
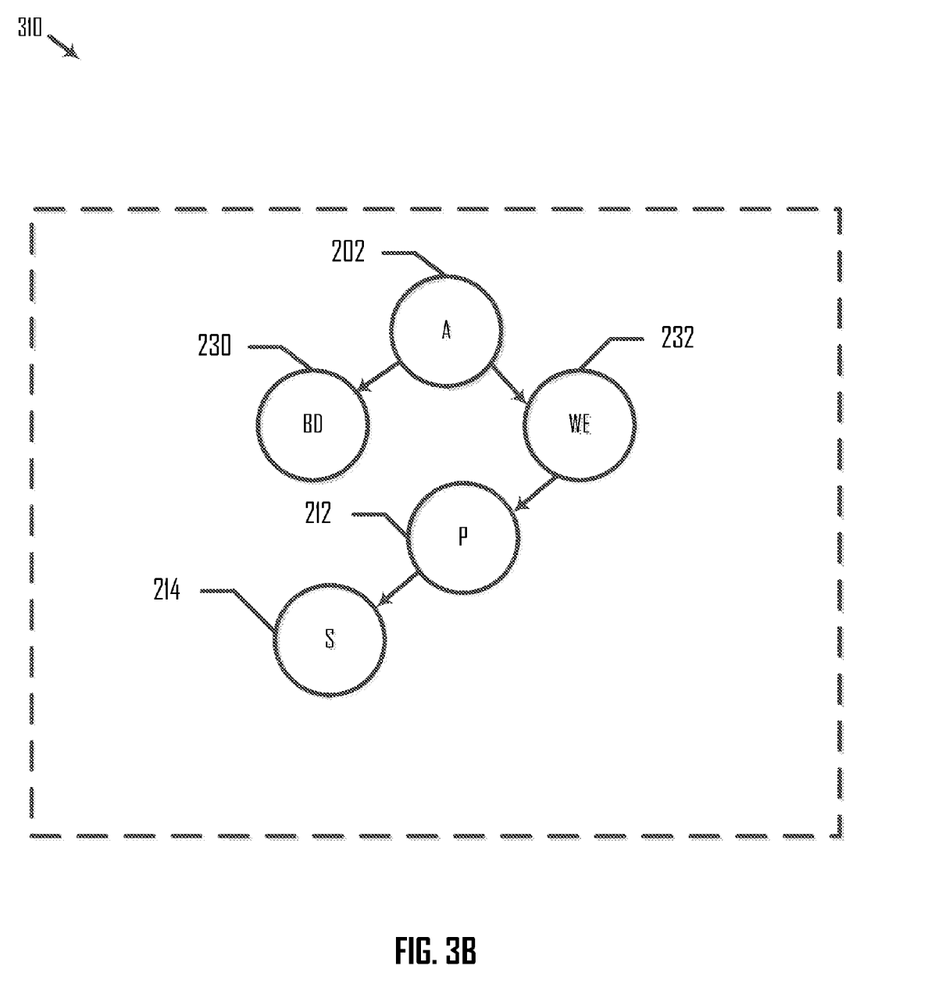
FIG. 3B is a block diagram illustrating an intermediate compressed radix tree resulting from a combination of containers in the initial radix tree illustrated in FIG. 3A, according to an embodiment.
Figure 3C:
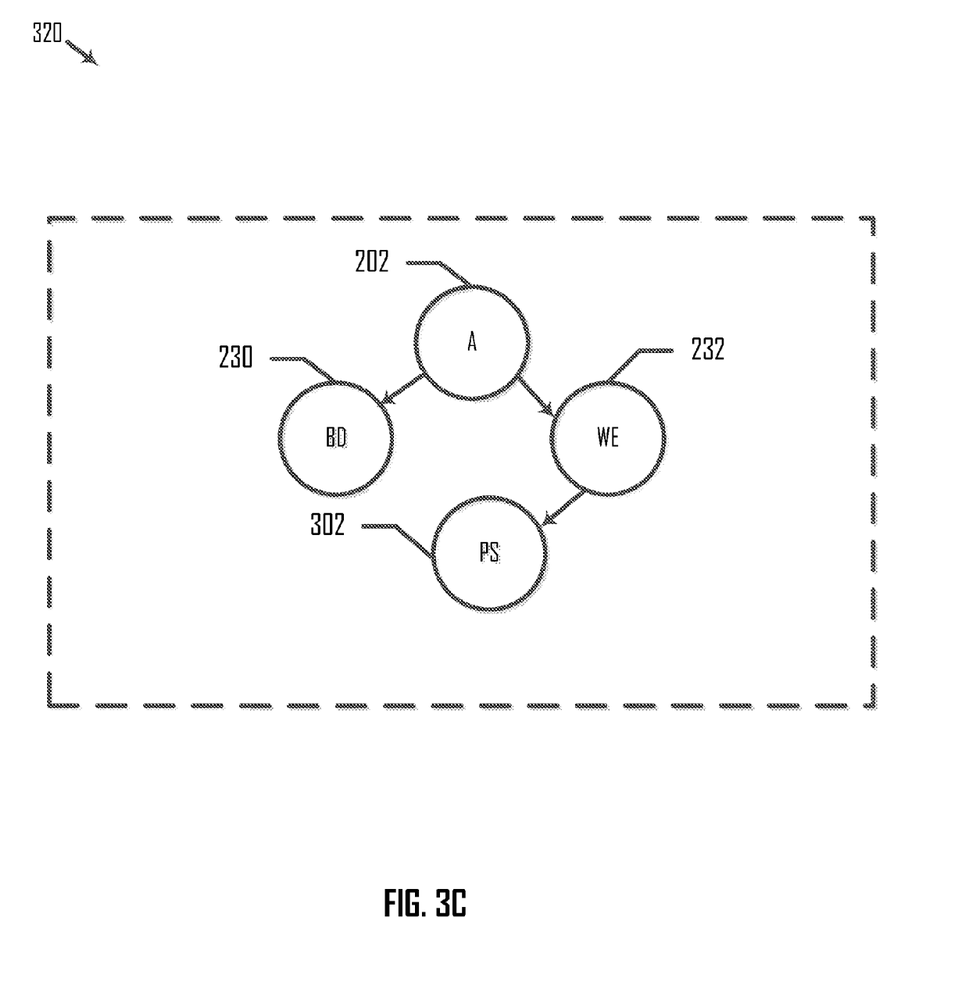
FIG. 3C is a block diagram illustrating a compressed radix tree resulting from the compression of the initial radix tree in FIG. 3A, according to an embodiment.

FIG. 3A is a block diagram illustrating an initial radix tree 306 including a plurality of containers, according to an embodiment. FIG. 3B is a block diagram illustrating an intermediate compressed radix tree 310 resulting from combining one or more pairs of containers in initial radix tree 306 into a single container, according to an embodiment. FIG. 3C is a block diagram illustrating a compressed radix tree 320 resulting from the compression of initial radix tree 306 in FIG. 3A, according to an embodiment. The description below will refer to FIGS. 3A-3C together to explain in further detail how radix tree compressor 110 compresses initial radix tree 306 to thereby create compressed radix tree 320.

FIG. 3A includes the containers illustrated in FIG. 2A except for container 216. Accordingly, in FIG. 3A container 212 has a single immediate child container. Initial radix tree 306 stores two keys or key prefixes. A first key or key prefix "ABD" is stored in containers 202, 204, and 206. A second key or key prefix "AWEPS" is stored in containers 202, 208, 210, 212, and 214.

Traverser 112 may traverse the containers at depth zero (e.g., root container 202), depth one (e.g., containers 204 and 208), and depth two (e.g., containers 206 and 210) as described above. FIG. 3B illustrates intermediate radix tree 310 including containers 202, 230, and 232, which were described above in relation to the traversal of the containers at depth zero, one, and two of initial radix tree 206 in FIG. 2A. Intermediate radix tree 310 includes container 212 located at a depth of two and container 214, which is a child of container 212, located at a depth of three. Traverser 112 has traversed all of the containers at depth one of intermediate radix tree 310 in FIG. 3B. Traverser 112 may then continue from a depth of one down by one-depth level to the containers located at a depth of two in intermediate radix tree 310 in FIG. 3B. Traverser 112 may traverse container 212, which is located at a depth of two in intermediate radix tree 310. Container 212 is a child of single container 232, which has a shorter depth in intermediate radix tree 310 than container 212. Additionally, referring back to FIG. 3A, container 212 is a child of container 210, which has a shorter depth in initial radix tree 306 than container 212.

Referring to FIG. 3B, traverser 112 may traverse container 212, which has a single immediate child container. Traverser 112 identifies container 212 as being a parent container having a single immediate child container (e.g., container 214). Container 212 includes a seventh set of elements "P" having a length of one, and container 214 includes an eighth set of elements "S" having a length of one. Compressor 114 determines whether a length of the seventh set of elements included in the parent container satisfies a threshold.

In keeping with the above example, the threshold is two and when the length of the set of elements included in the parent container is less than the threshold, the length satisfies the threshold. In such an example, when the length of the seventh set of elements is determined to be less than two, compressor 114 may combine containers 212 and 214 into a single container 302, which is illustrated in compressed radix tree 320 (FIG. 3C). In FIG. 3B, the length of the seventh set of elements "P" included in parent container 212 is one, which is less than the threshold of two. Thus, the length of the seventh set of elements included in the parent container satisfies the threshold. Compressor 114 combines parent container 212 and child container 214 (FIG. 3B) into a single container 302 (FIG. 3C). In FIG. 3C, compressed radix tree 320 includes single container 302 including "PS", which includes the seventh set of elements included in the parent container and the eighth set of elements included in the child container. By combining parent container 212 and child container 214, compressor 114 has compressed the number of depth levels of initial radix tree 306 from four to two.

Compressor 114 determines whether child container 214 is a leaf container. In the example illustrated in FIG. 3B, container 214 is a leaf container. Accordingly, compressor 114 may mark single container 302 as a leaf container or do nothing. Traverser 112 may determine how many children single container 302 has. Single container 302 in compressed radix tree 320 is located at a depth of two and has no children. Because single container 302 does not have a single immediate child container, single container 302 will not be combined with another container. No more containers are left to traverse in compressed radix tree 320.

FIG. 3A illustrates example initial radix tree 306 having seven containers and a depth of four. FIG. 3C illustrates a resulting compressed radix tree after compressor 114 compresses initial radix tree 306 to thereby create compressed radix tree 320. In FIG. 3C, compressed radix tree 320 stores the same two keys or prefix keys as those keys or prefix keys stored in FIG. 3A. For example, in FIG. 3C, the first key or prefix key "ABD" is stored in containers 202 and 230, and the second key or prefix key "AWEPS" is stored in containers 202, 232, and 302. In FIG. 3C, compressed radix tree 320 has four containers and a depth of two. In the examples illustrated in FIGS. 3A-3C, compressor 114 reduces initial radix tree 306's depth by two (e.g., from a depth of four to two) and the number of containers by three (e.g., from seven to four containers). Thus, compressed radix tree 320 may provide a faster lookup of keys that are not stored in the radix tree as compared to initial radix tree 306 because the containers in compressed radix tree 320 that are closer to the root container store more elements that may or may not match a sequence of elements in a key being search for. Additionally, when traverser 112 traverses compressed radix tree 320 to determine whether it stores a particular key or key prefix, compressed radix tree 320 has a shallower depth than initial radix tree 306 and thus traverser 112 traverses down fewer levels to make this determination as compared to traversing initial radix tree 306 to search for the key or key prefix.

As discussed above and further emphasized here, FIGS. 1, 2A-2B, and 3A-3C are merely examples, which should not unduly limit the scope of the claims. For example, it should be understood that one or more modules may be combined with another module. In an example, traverser 112 may be combined with compressor 114. It should also be understood that a module may be separated into more than one module. In an example, compressor 114 may be separated into a first compressor module and a second compressor module.

Additionally, the threshold may be any number greater than one. It may be desirable, however, to limit the elements included in a single container such that each container does not consume too much memory. It should also be understood that the threshold may be different for different containers. For example, a threshold of a container may depend on a depth of the container in the radix tree.

Further, although the threshold is described as being satisfied if the length of a set of elements included in the parent container is less than the threshold, this is not intended to be limiting. Other ways in which to compare the length of the set of elements included in the parent container to the threshold are within the scope of the disclosure. For example, in another embodiment, when the length of the set of elements included in the parent container does not exceed the threshold, the length satisfies the threshold. In another embodiment, when the length of the set of elements included in the parent container is less than or equal to the threshold, the length satisfies the threshold. The threshold may be set in accordance with the particular embodiment and how the length of the set of elements included in the parent container is compared to the threshold.

Additionally, although the elements have been illustrated in FIGS. 2A-2B and 3A-3C as being letters, it should be understood that this is not intended to be limiting. Other embodiments in which an element is different from a letter is within the scope of the disclosure. For example, one or more containers may include bits or other symbols.

III. Example Method

Figure 4:
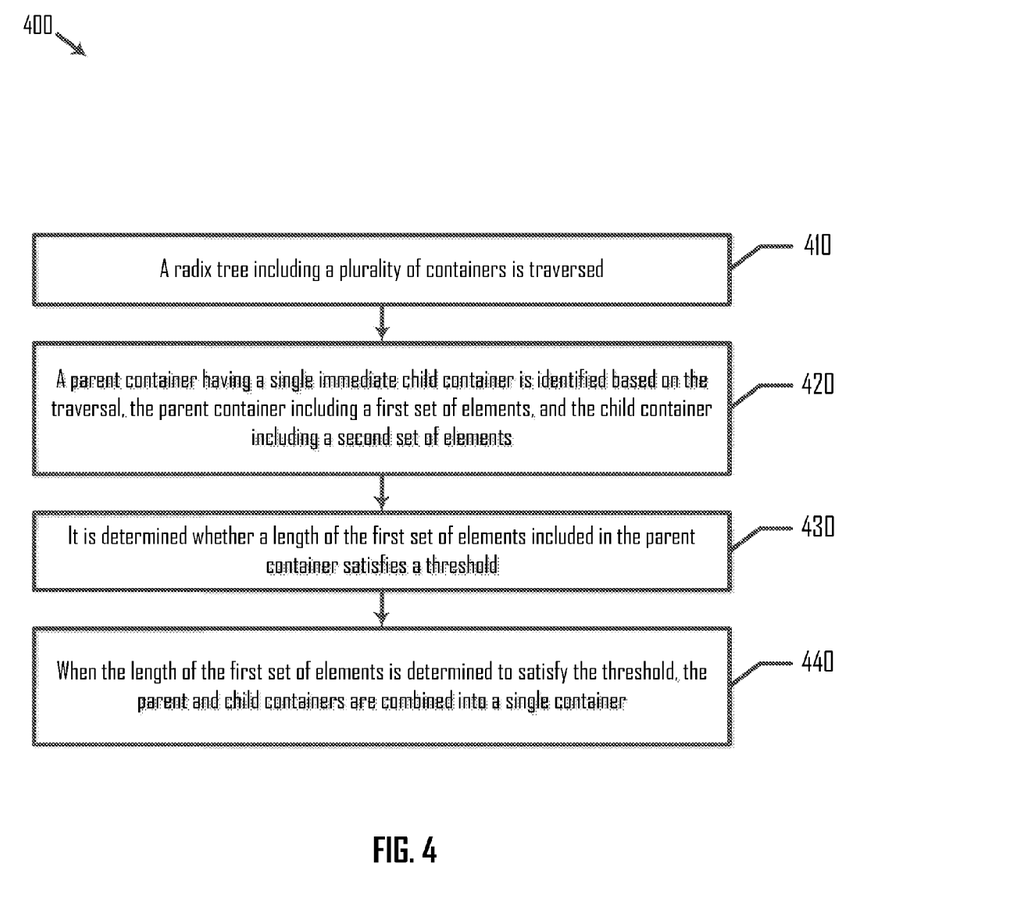
FIG. 4 is a flowchart illustrating a method of compressing a radix tree including a plurality of containers, according to an embodiment.

FIG. 4 is a flowchart illustrating a method 400 of compressing a radix tree including a plurality of containers, according to an embodiment. Method 400 is not meant to be limiting and may be used in other applications.

Method 400 includes actions 410-440. In an action 410, a radix tree including a plurality of containers is traversed. In an example, traverser 112 traverses initial radix tree 206 including containers 202-216. Initial radix tree 206 may store one or more keys or key prefixes. Initial radix tree 206 includes eight containers and has a depth of four. Retriever 104 or radix tree compressor 110 may receive an instruction to compress initial radix tree 206. Each container in initial radix tree 206 stores a single element that may make up part of a key.

In an action 420, a parent container having a single immediate child container is identified based on the traversal, the parent container including a first set of elements, and the child container including a second set of elements. In the example illustrated in FIG. 2A, traverser 112 identifies, based on the traversal, a parent container 204 having a single immediate child container (container 206), parent container 204 including a first set of elements, and child container 206 including a second set of elements. The first set of elements is "B" and has a length of one, and the second set of elements is "D" and has a length of one.

In an action 430, it is determined whether a length of the first set of elements included in the parent container satisfies a threshold. In an example, compressor 114 determines whether a length of the first set of elements included in the parent container satisfies a threshold. In an example, the threshold is two and when the length of the first set of elements included in parent container 204 is less than the threshold, the length satisfies the threshold. In such an example, the length of the first set of elements "B" is one, which is less than the threshold of two. Thus, compressor 114 determines that the length of the first set of elements included in parent container 204 satisfies the threshold.

In an action 440, when the length of the first set of elements is determined to satisfy the threshold, the parent and child containers are combined into a single container. In an example, when the length of the first set of elements "B" included in parent container 204 is determined to satisfy the threshold, compressor 114 combines parent container 204 and child container 206 (FIG. 2A) into a single container 230 (FIG. 2B).

It is also understood that additional processes may be performed before, during, or after actions 410-440 discussed above. It is also understood that one or more of the actions of method 400 described herein may be omitted, combined, or performed in a different sequence as desired. In an example, actions 420-440 are applied to one or more (or all) containers at each depth level of a radix tree to compress the radix tree.

IV. Example Computing System

Figure 5:
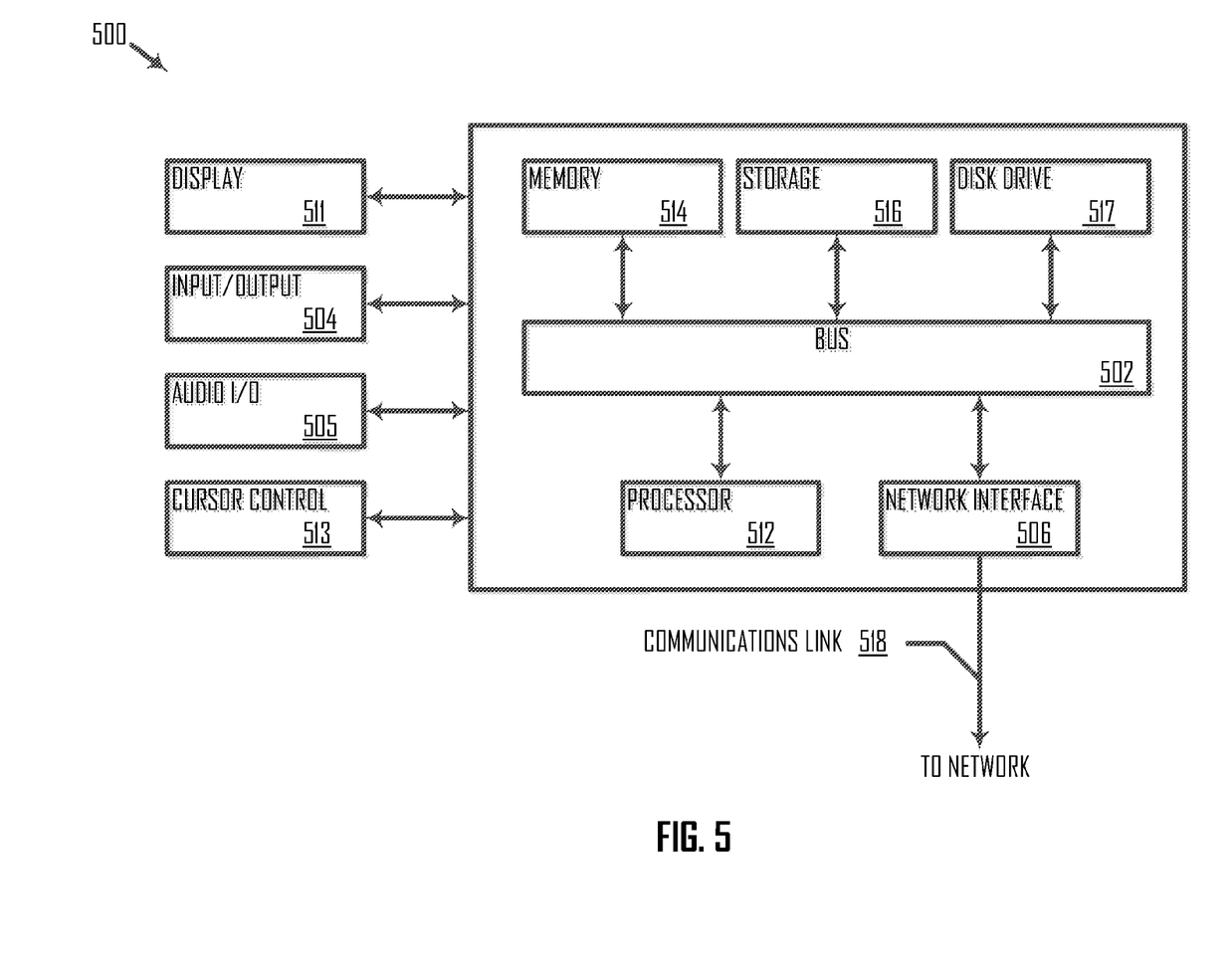
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, computing device 102 may include a client or a server computing device that includes one or more processors and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 400) to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various action described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of compressing a radix tree including a plurality of containers, comprising:
   traversing a radix tree including a plurality of containers;
   identifying, based on the traversing, a parent container having a single immediate child container, the parent container including a first set of elements, and the child container including a second set of elements;
   determining whether a length of the first set of elements included in the parent container satisfies a threshold; and
   when the length of the first set of elements is determined to satisfy the threshold, combining the parent and child containers into a single container.

2. The method of claim 1, wherein the child container includes a single element.

3. The method of claim 1, wherein when the length of the first set of elements is less than the threshold, the length satisfies the threshold.

4. The method of claim 1, wherein the traversing includes traversing from a root node of the radix tree towards a leaf node of the radix tree.

5. The method of claim 4, further including:
after the combining, identifying, based on the traversing, a second parent container having a second immediate child container, the second parent container including a third set of elements and the second immediate child container including a fourth set of elements, the second parent container having a single child, and the first parent container having a shorter depth in the radix tree than the second parent container;
determining whether a length of the third set of elements satisfies threshold; and
when the length of the third set of elements is determined to satisfy the threshold, combining the second parent container and the second immediate child container.

6. The method of claim 1, wherein the combining includes appending the second set of elements as a suffix to the first set of elements included in the parent container, and wherein the single container is the parent container.

7. The method of claim 1, wherein the combining includes appending the first set of elements as a prefix to the second set of elements included in the child container, and wherein the single container is the child container.

8. The method of claim 1, wherein further including:
determining whether the single container has a second immediate child container, the single container having a single child and including a third set of elements;
determining whether a length of the third set of elements satisfies the threshold; and
when the length of the third set of elements is determined to satisfy the threshold, combining the single container and the second immediate child container into a second single container.

9. The method of claim 1, further including:
determining whether the child container is a leaf container; and
when the child container is determined to not be a leaf container:
identifying a set of children of the child container; and
replacing the child container with the single container as the parent of the set of children.

10. The method of claim 9, further including:
when the child container is determined to be a leaf container, marking the single container as a leaf container.

11. The method of claim 1, further including:
determining whether the parent container has a value, wherein the combining includes when the length of the first set of elements is determined to satisfy the threshold and when the parent container is determined to not have the value, combining the parent and child containers into the single container.

12. A system for compressing a radix tree, comprising:
a retriever that retrieves a radix tree stored in a memory;
a traverser that traverses the radix tree, and identifies, based on the traversal, a parent container having a single immediate child container, wherein the parent container includes a first set of elements, and the child container includes a second set of elements; and
a compressor that determines whether a length of the first set of elements included in the parent container satisfies a threshold, wherein when the length of the first set of elements is determined to satisfy the threshold, the compressor combines the parent and child containers into a single container.

13. The system of claim 12, wherein the compressor reduces a depth of the radix tree.

14. The system of claim 12, wherein each container in the retrieved radix tree includes a single element.

15. The system of claim 12, wherein a container is a node or an edge in the radix tree.

16. The system of claim 12, wherein when the length of the first set of elements is less than the threshold, the length satisfies the threshold.

17. The system of claim 12, wherein the traverser traverses from a root node of the radix tree towards a leaf node of the radix tree.

18. The system of claim 12, wherein the traverser traverses a parent of a container before traversing the container.

19. The system of claim 12, wherein the compressor determines whether the child container is a leaf container, wherein when the child container is determined to not be a leaf container, the compressor identifies a set of child containers of the child container and replaces the child container with the single container as the parent of the set of one or more children.

20. A machine-readable medium comprising a plurality of machine-readable instructions that when executed by one or more processors is adapted to cause the one or more processors to perform a method comprising:
traversing a radix tree including a plurality of containers;
identifying, based on the traversing, a parent container having a single immediate child container, the parent container including a first set of elements, and the child container including a second set of elements;
determining whether a length of the first set of elements included in the parent container satisfies a threshold; and
when the length of the first set of elements is determined to satisfy the threshold, combining the parent and child containers into a single container.

* * * * *